US006459237B1

(12) United States Patent
Bausch

(10) Patent No.: US 6,459,237 B1
(45) Date of Patent: Oct. 1, 2002

(54) BATTERY CHARGER APPARATUS AND METHOD

(75) Inventor: James F Bausch, Salem, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 134 days.

(21) Appl. No.: 09/594,130

(22) Filed: Jun. 13, 2000

(51) Int. Cl.⁷ .................................................. H02J 7/00
(52) U.S. Cl. ...................................... 320/125; 320/122
(58) Field of Search ................................ 320/125, 122, 320/127, 128, 132, 137, 151, 152, 160, 161, 162; 323/282, 284, 285

(56) References Cited

U.S. PATENT DOCUMENTS 5,371,456 A * 12/1994 Brainard .................... 320/161
5,648,715 A * 7/1997 Patino et al. ............... 320/152
5,731,685 A * 3/1998 Jones ......................... 320/150
5,850,136 A * 12/1998 Kaneko ...................... 320/122

\* cited by examiner

Primary Examiner—Bao Q. Vu
Assistant Examiner—Lawrence Luk
(74) Attorney, Agent, or Firm—Timothy F. Myers

(57) ABSTRACT

A charger for a battery includes a power source and a control circuit. The battery has an internal resistance, at least one cell having a recommended charge voltage, and an aggregate recommended charge voltage. The power source is capable of providing an applied voltage and charge current to the battery. The control circuit is connected to the power source and is capable of detecting the applied voltage of the battery and enabling the charge current and applied voltage to the battery until the applied voltage is greater than the aggregate recommended charge voltage by an amount less than the product of the internal resistance and the charge current. The control circuit is capable of reducing the applied voltage towards the aggregate recommended charge voltage at a controlled rate such that the recommended charge voltage of the at least one cell is not exceeded.

23 Claims, 8 Drawing Sheets

| APPLIED VOLTAGE | CHARGE CURRENT | TIME ELAPSED | CAPACITY |
|---|---|---|---|
| 12.80 | 2.5 | 65 min. | 77% |
| 12.77 | 2.2 | 70 | 83 |
| 12.74 | 1.9 | 75 | 87 |
| 12.71 | 1.6 | 80 | 91 |
| 12.68 | 1.3 | 85 | 95 |
| 12.65 | 1.0 | 90 | 97 |
| 12.62 | 0.7 | 95 | 99 |
| 12.60 | 0.4 | 100 | 100 |
| 12.60 | 0.1 | 105 | 100 |

Fig. 8

| APPLIED VOLTAGE | CHARGE CURRENT | TIME ELAPSED | CAPACITY |
|---|---|---|---|
| 12.80 | 1.8 | 105 min. | 89% |
| 12.77 | 1.5 | 110 | 93 |
| 12.74 | 1.2 | 115 | 96 |
| 12.71 | 0.9 | 120 | 98 |
| 12.68 | 0.6 | 125 | 99 |
| 12.65 | 0.3 | 130 | 100 |
| 12.62 | 0 | 135 | 100 |

Fig. 9

BATTERY CHARGER APPARATUS AND METHOD

FIELD OF THE INVENTION

The invention relates to battery charging, more particularly, the invention relates to improving charge parameters by trimming the charge voltage.

BACKGROUND OF THE INVENTION

Rechargeable battery packs comprising one or more rechargeable battery cells are widely used to supply power to a variety of portable electronic devices. Rechargeable battery packs save the purchaser of an electronic device the cost of continuously purchasing replacement batteries over the useful life of the device. Additionally, environmental concerns relating to disposal of non-rechargeable batteries points to an increasing use of rechargeable battery packs in the future. A number of chemical compositions have been proposed for rechargeable battery cells including nickel-cadmium (Ni—Cd), lithium-ion (Li-Ion), lithium-polymer (Li-polymer) and nickel-metal hydroxide (sometimes referred to as nickel-metal hydride) (Ni—MH).

Presently, there are battery charging apparatuses with multiple charging stations or electronic devices with charging bays capable of charging at least one or more battery packs. Typical charging apparatuses have a single charging power source or supply and sequentially charge the battery packs disposed in respective charging stations. This sequential charging method is efficient for Ni—Cad cells because these battery cells accept a very rapid charge, that is, if the charger power source can provide enough charging current, an Ni—Cd battery cell can be charged in 15 to 20 minutes. However, Li-Ion or Li-Polymer cells require longer charging times and this sequential charging method is not as acceptable to most users of the electronic devices.

More expensive battery charging apparatuses include a separate charging power supply for each of the charging stations. Conceptually, such chargers can be thought of as a plurality of individual chargers supported in a single housing. Multiple power supplies permit simultaneous charging of a battery cell or pack at each charging station thereby reducing total charging time for charging a plurality of batteries. The major disadvantage of such charging apparatuses is the increased expense associated with providing the plurality of power supplies.

Li-Ion battery cells have proven to be very efficient in terms of watt-hours per unit volume of the cell and high output voltage generated by the cell. Additionally, Li-Ion cells exhibit a long useful life. Thus, battery packs comprising one or more Li-Ion battery cells have found increasing use in a variety of portable electronic devices requiring a compact, higher voltage power supply such as portable computers, cell phones, digital cameras, and personal data assistants. For example, the Model No. 18650 Li-Ion battery cell available from Toshiba has a 4.2 volt output voltage potential when the cell is fully charged. The cell is considered discharged when the output voltage potential drops to about 2.6 volts. During charging of a Li-Ion battery cell, the charging current through the cell must be limited. In the case of the Toshiba Li-Ion cell, charging current must be limited to a maximum of 1.25 Amps, otherwise damage to the cell may result. In addition, the cell has a recommended charge voltage that must not be exceeded for safety reasons.

In typical applications, two or more Li-Ion battery cells are disposed in a casing and electrically coupled in series and parallel to form a rechargeable Li-Ion battery pack. The battery pack has an aggregate maximum charging current based on the number of cells in parallel and an aggregate recommended charge voltage based on the number of cells in series. The battery pack is sized to fit in a battery pack receiving opening or bay of an electronic device. During use of the device, the battery pack gradually discharges as it supplies power to the electronics of the device. When the power supplied by the pack falls below a threshold value, the pack is either recharged in the device itself or removed from the device and recharged using a recharging apparatus.

A discharged Li-Ion battery cell has a very low charging impedance. Therefore, when such a cell is first inserted or docked in a charging station of a charging apparatus, the charging current must be limited to a maximum charging current for that cell to avoid damaging the cell. During the charging process, chemical reactions within the Li-Ion cell cause the charging impedance of the cell to increase. As the cell charging impedance increases, the applied voltage will increase proportionately with cell charging impedance until the applied voltage equals the recommended charge voltage for the cell. The time required for the charging voltage to reach the recommended charge voltage is referred to as the crossover time.

After the crossover time is reached, the charging apparatus limits the applied voltage to the recommended charge voltage to avoid damaging the cell. Since the battery charging impedance continues to increase at a decreasing exponential rate as the cell charges, charge current decreases exponentially until the cell is fully charged. For a typical Li-Ion 4.2 volt cell, crossover time is achieved after about 45 minutes while full charging requires about three hours.

In order to minimize total charging time for a rechargeable battery pack, the charging apparatus preferably provides as much charging power as possible during the period up to the crossover time while making sure that the aggregate maximum charging current limit for the battery pack is not exceeded. For a battery pack comprising six typical Toshiba Li-Ion cells electrically connected in a 3-series by 2-parallel arraignment, the values for the maximum charge current and the aggregate recommended charge voltage are 2.5 amps and 12.6 volts respectively.

Rechargeable battery packs are utilized extensively in powering a variety of portable electronic devices. One such device is the portable computer where the battery functions to provide power to the various circuitry therein. Of course, the battery requires charging periodically in order to provide the power required from it. Several current battery charging apparatus have two or more charging circuits or algorithms available so that the battery may be charged more rapidly or more slowly, depending on the other functions required of the portable computer by a user. While rapid charging of a battery is generally preferred in that it drastically reduces the time required for charging, it has been found that having an option with respect to the charging rate to reduce the power consumed is useful in preventing overheating of the battery or the portable computer during charging and otherwise maximizing the effectiveness of the battery in the portable computer.

In light of the foregoing, a primary objective of the present invention is to provide an apparatus and method for enabling rapid charging of a battery or for reducing the peak power required during charging in an electronic device or a stand-alone battery charger.

SUMMARY

A charger for a battery includes a power source and a control circuit. The battery has an internal resistance, at least one cell having a recommended charge voltage, and an aggregate recommended charge voltage. The power source is capable of providing an applied voltage and charge current to the battery. The control circuit is connected to the power source and is capable of detecting the applied voltage of the battery and enabling the charge current and applied voltage to the battery until the applied voltage is greater than the aggregate recommended charge voltage by an amount less than the product of the internal resistance and the charge current. The control circuit is capable of reducing the applied voltage towards the aggregate recommended charge voltage at a controlled rate such that the recommended charge voltage of the at least one cell is not exceeded.

BRIEF DESCRIPTION OF THE DRAWINGS

FIG. 8 is a table showing the exemplary relationship between charging parameters for using the invention to reduce charge time.

FIG. 9 is a table showing the exemplary relationship between charging parameters for using the invention to reduce peak power output.

DETAILED DESCRIPTION OF THE PREFERRED AND ALTERNATE EMBODIMENTS

Figure 1:
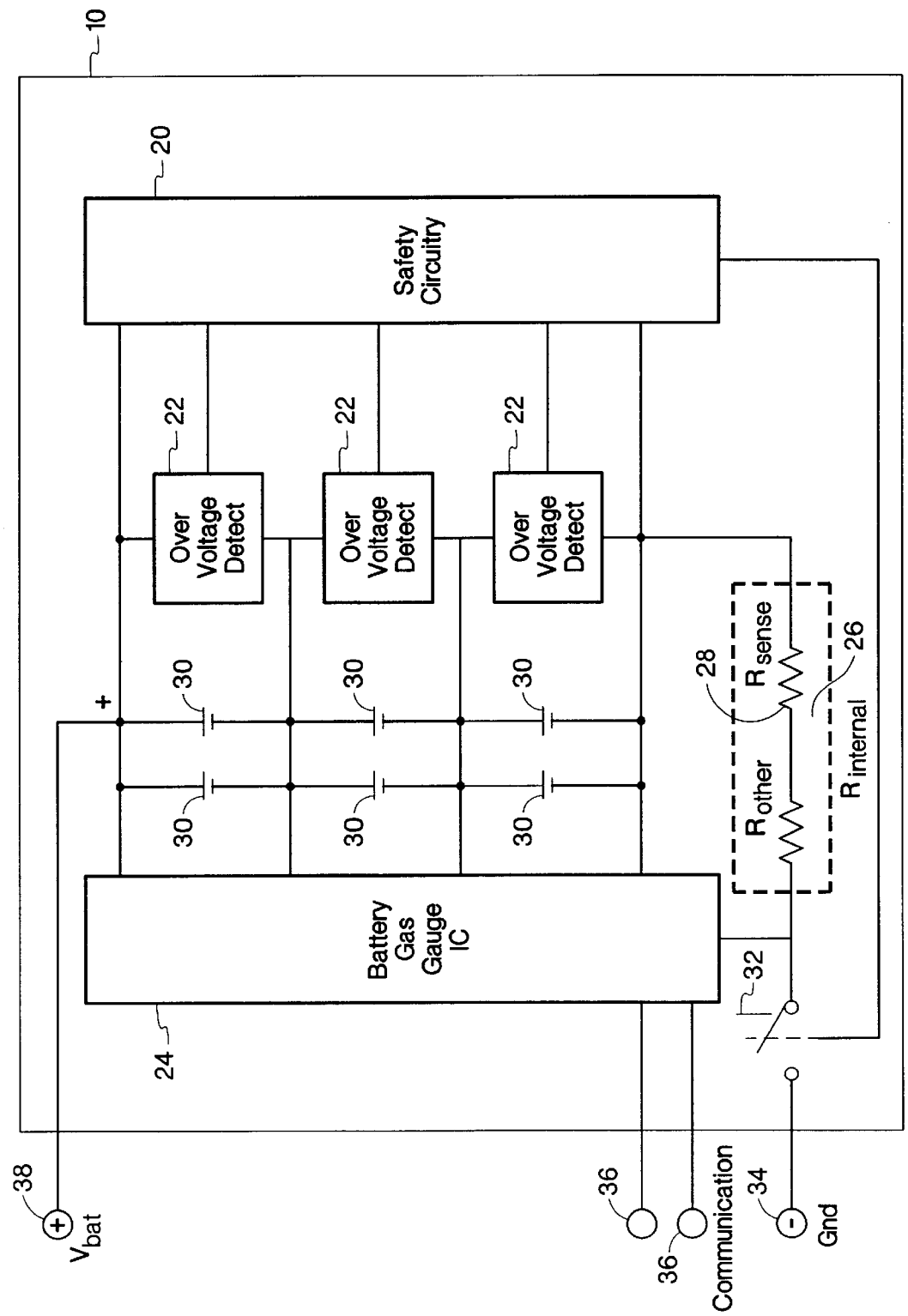
FIG. 1 is an exemplary block diagram of a conventional battery pack.

Portable computers and other mobile electronic devices include rechargeable battery packs in order to supply a readily available power source. The battery packs are made up of one or more battery cells in a serial manner to obtain a desired voltage output. The type of cell and its combination with other cells in a parallel manner determine the available current that the battery pack can provide during use or accept during charging. The battery cells themselves have an internal resistance that also limits the available current to and from each cell. The battery pack also has an aggregate internal resistance that is dependent on the internal resistance of the individual cell and the wiring used to connect the cells together. In addition, current sense and safety protection circuitry contributes to the internal resistance of the battery pack. When a battery pack is recharged, a recommended charge voltage is applied to each cell in the battery pack. Often times the battery pack will have an aggregate recommended charge voltage.

Some types of battery packs such as Li-Ion or Li-Polymer, to name a couple, have safety circuits to detect the applied charge voltage on the battery pack to ensure that the recommended charge voltage to each cell and the aggregate recommended charge voltage to the battery pack are not exceeded beyond the design safety limit. The design safety limit is usually only a few hundred millivolts above the recommended charge voltage. Therefore, battery chargers for these types of batteries require tight voltage regulation during charging to prevent accidental tripping of the safety circuit. A conventional constant current/constant voltage type charging scheme provides this tight regulation. A constant current is supplied until the aggregate recommended charge voltage is reached, then a constant voltage equal to the aggregate recommended charge voltage is maintained on the battery until it is fully charged. For Lithium-Ion and Lithium-polymer type batteries, this results in a charge cycle that includes an exponentially decaying charge current during the period of constant voltage.

The invention provides an alternative method to charging a battery pack or cell than the conventional constant current/constant voltage method. The invention substantially eliminates the exponentially decaying charge current after the crossover time is reached by trimming the applied charge voltage to the battery thereby causing the charge current to the battery to be maintained longer and then to subsequently decline in a substantially linear manner during the latter portion of the charge cycle. This improved method of charging can be used to either reduce the charging time required to charge a battery or alternatively to reduce the amount of charge current and thus the peak power applied to the battery. The invention's battery charger's power source applies a voltage and a charge current to the battery during charging as does a conventional battery charger. However, after the crossover time is reached the invention's charger control circuit allows the applied voltage to the battery to increase by a small amount to account for the product of the battery's internal resistance and the charge current flowing through the battery. To prevent the battery's safety circuit from activating due to exceeding the recommended charge voltage on the battery cells, the control circuit subsequently reduces the trim voltage at a controlled rate towards the aggregate recommended charge voltage. Preferably, this controlled rate of reducing the applied voltage is substantially linear resulting in a linear reducing charge current. However, decreasing the trim voltage as determined by discrete time intervals can also perform this controlled rate. Alternatively, the controlled rate can be performed by decreasing the trim voltage upon detecting discrete current levels of charge to the battery. Further methods of controlling the rate of decline of the trim voltage include using a gas gauge IC that is connected to battery cells to detect the individual or aggregate cell voltage or the charge capacity gauge of the battery and accordingly reduce the applied voltage to the battery based on discrete levels of these parameters detected. It is also possible if the battery charger's power source has a controllable current source to control the amount of current delivered during charging after the crossover time.

An alternative approach to controlling the applied voltage is to modify the battery sense voltage detected from the battery by the battery charger. This approach initially reduces the sensed voltage from the battery to the battery charger to cause the battery charger to accordingly increase the voltage to the battery. When the battery has reached a capacity of about 70% (approximately the crossover time), the sensed voltage from the battery is increased accordingly until at full charge the sensed voltage at the charger from the battery is the aggregate recommended charge voltage for the battery. This alternate embodiment allows for easy adaptation of conventional battery charger circuits to provide for either reducing charging time or peak power during charging. Preferably, a pulse width modulation or other analog to digital converter is used to modify and adjust the battery sense voltage detected from the battery by the charger Further understanding of this invention will be apparent from the following detailed description of different embodiments of the invention.

FIG. 1 is an exemplary block diagram of a conventional battery pack 10 having at least one battery cell 30. The battery cells 30 shown in FIG. 1 are in a 3-series/2-parallel configuration. However, the battery cells 30 can be combined in any parallel, serial or parallel and serial fashion to achieve a desired battery pack voltage and current providing capacity and still meet the spirit and scope of the invention. For some battery types such as lithium-ion or lithium-polymer batteries, the battery cells 30 are connected to an overvoltage protection circuit 22 which monitors the individual cell voltage to prevent a voltage greater than the recommended charge voltage for the cell from occurring which might damage the battery cells 30. This overvoltage can occur from improper battery charging or when one of the battery cells 30 fails during proper charging. The overvoltage protection circuits 22 outputs are monitored by safety circuitry 20 which further controls a switch 32 the opens to prevent charging the battery pack when an overvoltage condition occurs on one or a combination of the battery cells 30. Under normal operation, switch 32 is closed to allow charge and discharge currents to flow to/from the battery pack 10. The battery pack 10 optionally includes a battery gas gauge IC 24, such as a Benchmarq bq2060 from Texas Instruments, that is used to indicate to a user of the battery the amount of charge capacity remaining in the battery pack. Several different schemes exist for monitoring the battery charge capacity and include charge counting and battery voltage monitoring to name a couple. For charge counting, the battery gas gauge IC 24 monitors the current passing through a sense resistor 28 during both charge and discharge of the battery pack 10. For battery voltage monitoring, the gas gauge IC 24 monitors the individual or aggregate cell voltage of the battery cells 30 and extrapolates a charge capacity level based on the voltage sensed. The battery pack has an internal resistance 26 which represents an aggregate of the sense resistor 28, combined internal resistance of the individual battery cells 30, the resistance of switch 32 and any wiring or contact resistance formed when fabricating the battery pack 10. A communication channel 36 that is formed of one or more signals monitors the battery gas gauge 24. Preferably the communication channel 36 supports the Smart Battery Data commands, however several other standards exist and are known to those skilled in the art. The positive terminal 38 of the battery is shown as Vbat. The negative terminal 34 is shown as GND (ground) for a reference level.

Figure 2:
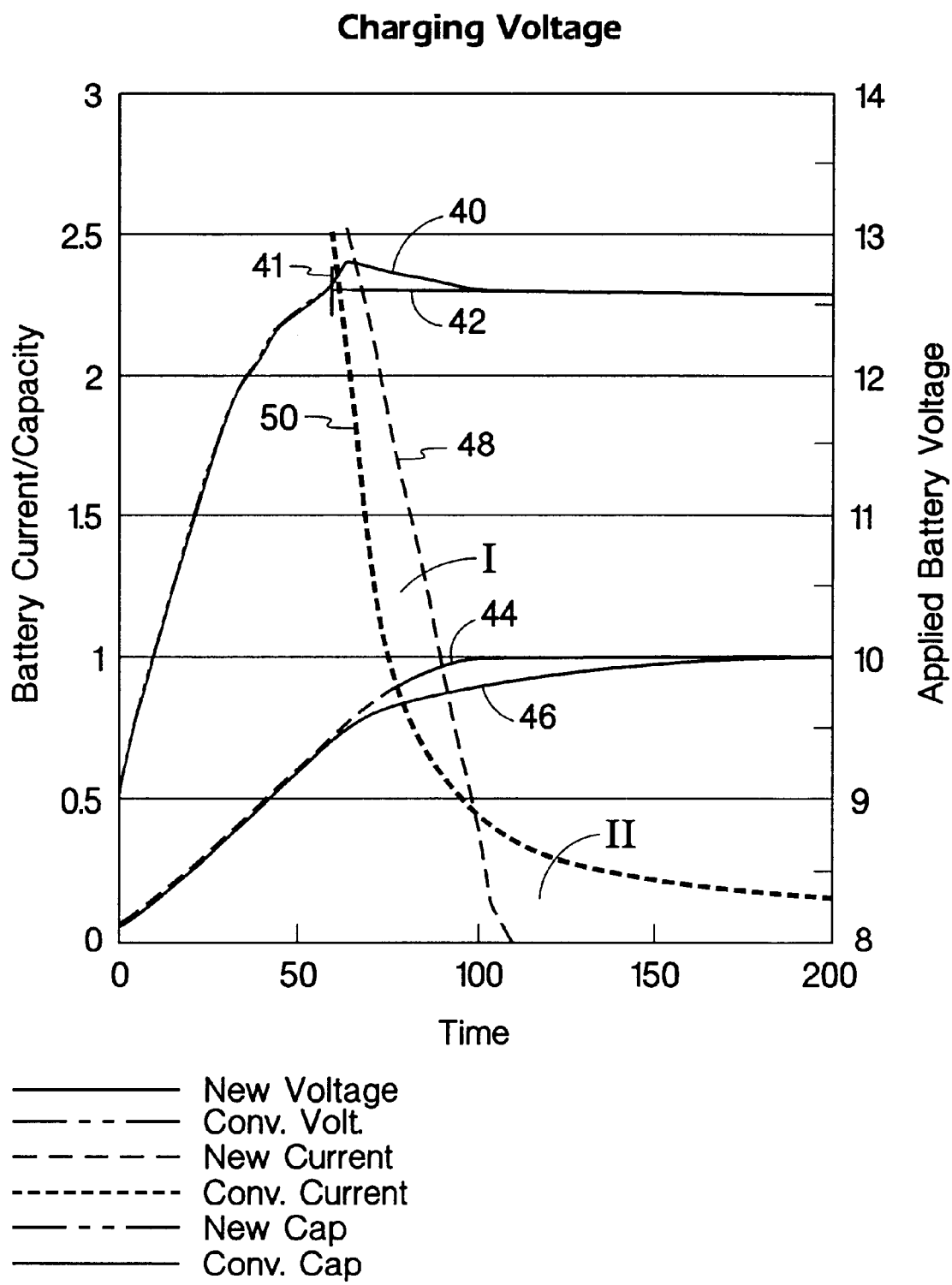
FIG. 2 is an exemplary graph of conventional battery charging parameters and the invention's new charging method that reduces the time to charge a battery.

FIG. 2 is an exemplary graph showing a conventional and the new charging method for the particular exemplary battery pack of FIG. 1. For the conventional constant current/constant voltage charge scheme, a constant current of 2.5 Amps is applied to the battery pack 10 and the applied battery voltage rises as time progresses as illustrated as conventional voltage 42. Once the applied voltage battery voltage reaches the aggregate recommended charge voltage of 12.6 Volts at the crossover time 41, the conventional battery charger changes to a constant voltage mode by applying the aggregate recommended charge voltage to the battery. As the battery cells 30 become charged, they act similar to very large capacitors and an RC circuit consisting of the internal resistance 26 and the capacity of the battery cells 30 forming a time constant with a resulting exponentially decaying profile as shown with conventional current 50. Due to the exponential decay of the charging current after the crossover time 41, the last 30% of battery capacity requires about ⅔ of the total charging time.

The invention essentially eliminates the exponential decay by trimming the applied battery charge voltage after the crossover time 41 as shown in new voltage 40. As seen in new current 48, a 2.5 A current is applied until the aggregate recommended applied charge voltage is reached. This 2.5 A current is continued after the crossover time 41 and the applied charge voltage is allowed to exceed the aggregate recommended applied charge voltage up to predetermined peak level or delta amount approximately equal to the product of the battery pack internal resistance 26 and the 2.5 A charge current. Since the delta amount or trim voltage drops across the internal resistance 26, the battery cells 30 recommended cell voltage is not exceeded and the overvoltage protection circuits 22 will not be activated. Once the applied voltage reaches the peak level, the rate of decline of the applied voltage is controlled such that the charge current (new current 48) to the battery is substantially linear to remove the exponential tail of the conventional current charging scheme. As can be seen in the difference in the capacity curves, new capacity 44 approaches a 100% charge level at a much faster rate than conventional capacity 46. Thus the amount of charge time required to fully charge the battery is reduced while preventing the battery cells 30 voltage from exceeding the recommend charge voltage 30 level. To ensure the same amount of charge capacity, the controlled rate of current decline should be designed such that the area of region I bounded by conventional current 50 and new current 48 is substantially equal to the area of region II bounded by conventional current 50 and new current 48.

Alternatively, rather than changing the charge time, the invention can be used to reduce the peak power applied to the battery during charging. This reduction of power is important for electronic devices that require a large amount of power from an external power adapter to operate such as a portable computer. The heat dissipated in charging the battery is combined with the heat generated by the portable computer within the portable computer case. By reducing the peak power of the battery charger, the total amount of heat dissipation within the case is reduced. Optionally, a smaller power adapter can be substituted thus creating a lower cost and lighter solution for the portable computer user.

Figure 3:
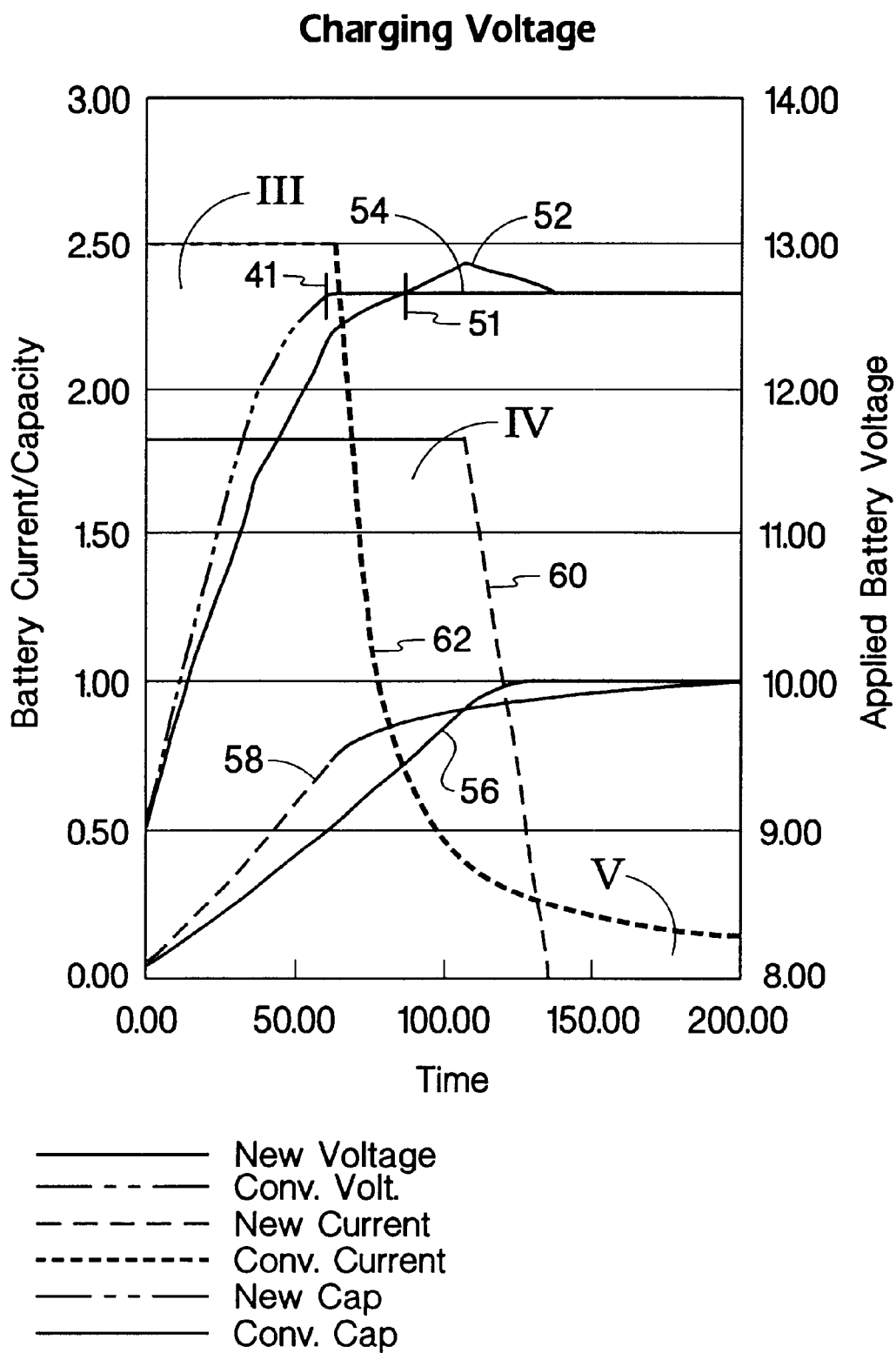
FIG. 3 is an exemplary graph of conventional battery charging parameters and the invention's new charging method that reduces the peak power required to charge a battery.

FIG. 3 is an exemplary graph showing the charging characteristics for this alternative scheme compared to the conventional charging scheme. For the conventional scheme, conventional current 62 shows a 2.5 Amp charge current until the applied charge voltage reaches the aggregate recommended charge voltage of 12.6V at crossover time 41. A constant voltage equal to the recommended charge voltage of 12.6V is then applied to the battery as illustrated in conventional voltage 54. During this time of constant voltage after crossover time 41, the conventional current 62 is shown as exponentially decaying. For the alternative scheme, new current 60 shows a constant current of 1.8 A occurring until the applied battery charge voltage is equal to the aggregate recommended charge voltage and the addition of the product of the internal resistance 26 with the charge current of 1.8 A as illustrated in new voltage 52.

Subsequently, the applied voltage to the battery is controlled at a declining rate such that the charge current to the battery declines in a substantially linear manner. In this alternative scheme, the peak amount of power supplied to the battery is lowered during charging yet the charging time is essentially the same as the conventional scheme. The rate of charge capacity of the battery is slowed but due to the controlled rate of current into the battery, the new capacity 56 catches an exceeds the conventional capacity 58 of the conventional scheme. To ensure that the battery receives the same amount of charge the area of region IV bounded by conventional current 62 and new current 60 should equal the combined areas of region III and region IV both bounded by conventional current 62 and new current 60. The new capacity 56 is shown as first 30 trailing then overtaking conventional capacity 58 as the battery charges.

Figure 4:
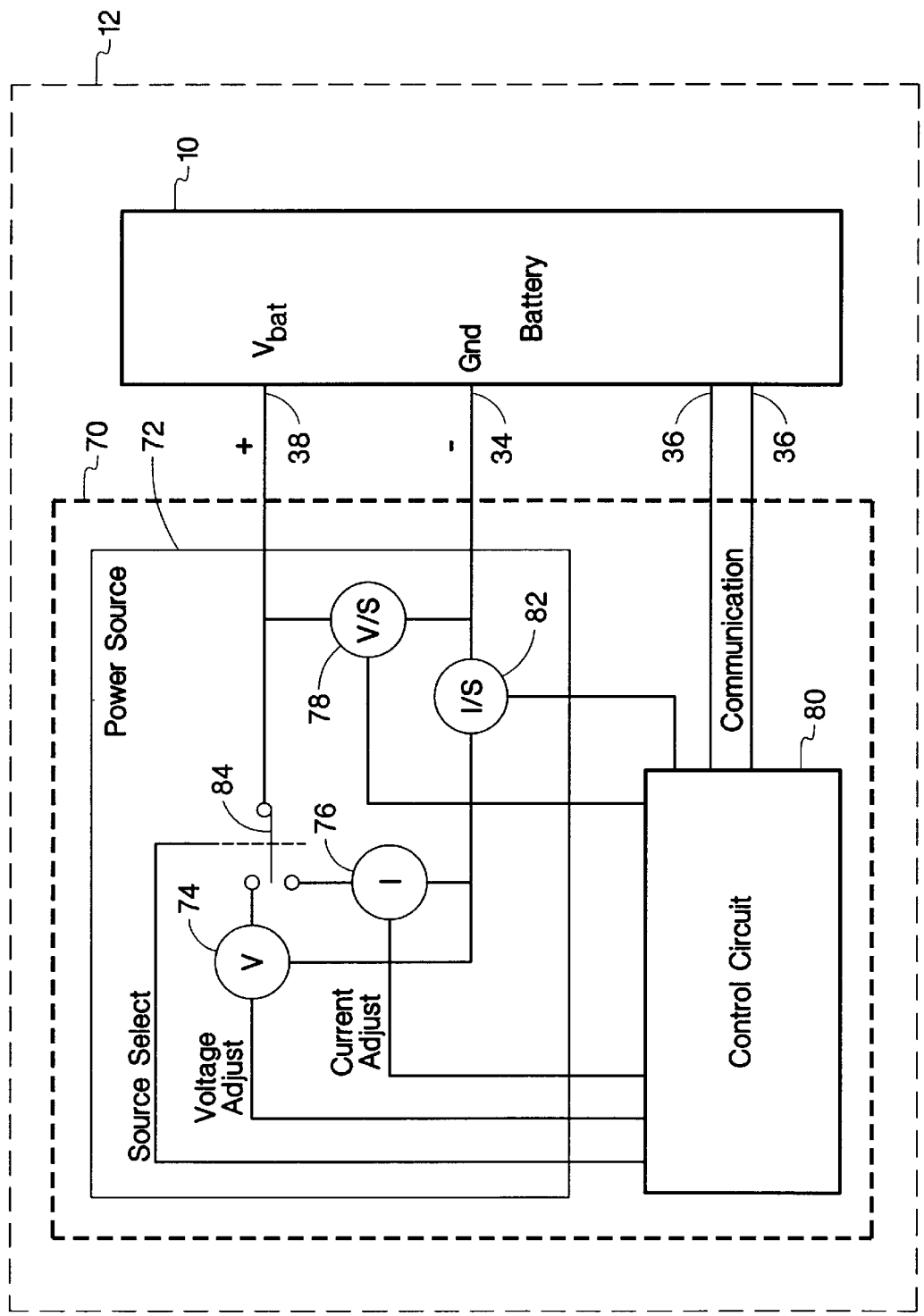
FIG. 4 is an exemplary block diagram of an embodiment of a battery charger for implementing the invention.

FIG. 4 is an exemplary block diagram for an embodiment of a battery charger 70 in an electronic device 12 that implements the invention. Battery charger 70 includes a control circuit 80 and a power source 72. The power source 72 is connected to the positive terminal 38 and negative terminal 34 of battery 10. The control circuit 80 is preferably, but optionally, connected to communication channel 36 of the battery 10. The power source 72 includes preferably a voltage source 74 and a current source 76. The voltage output of voltage source 74 and the current output or current source 76 are adjustable by the control circuit 80 and selectable by the control circuit 80 by select switch 84. Optionally, the power source 72 may include only a voltage source with a maximum current output, or a current source with a programmable maximum voltage output. The power source 72 also preferably, but optionally includes a voltage sense 78 and a current sense 82 for monitoring by control circuit 80 the applied voltage and charge current of the battery 10. Optionally, if supported by the battery gas gauge IC, the control circuit 80 can monitor the battery parameters using communication channel 36. When beginning the charging cycle for a discharged battery 10, the control circuit 80 selects current source 76 to supply a charge current to the battery 10. During charging, the control circuit monitors the applied voltage to the battery 10 until the aggregate recommended charge voltage plus the trim voltage (a delta amount approximately equal to the product of the internal resistance of the battery and the charge current) is reached. The control circuit 80 then selects the voltage source 74 using select switch 84 and sets the voltage source output to the previously sensed applied voltage. The control circuit then monitors either time, current sense 82, or gas gauge parameters such as capacity, charge current or cell voltage through the communication channel 36 of the battery 10 to provide a controlled rate of decline on the applied voltage from voltage source 74 such that the charge current to the battery 10 is substantially linear or that the recommended charge voltage of the cells in the battery 10 are not exceeded.

Figure 5:
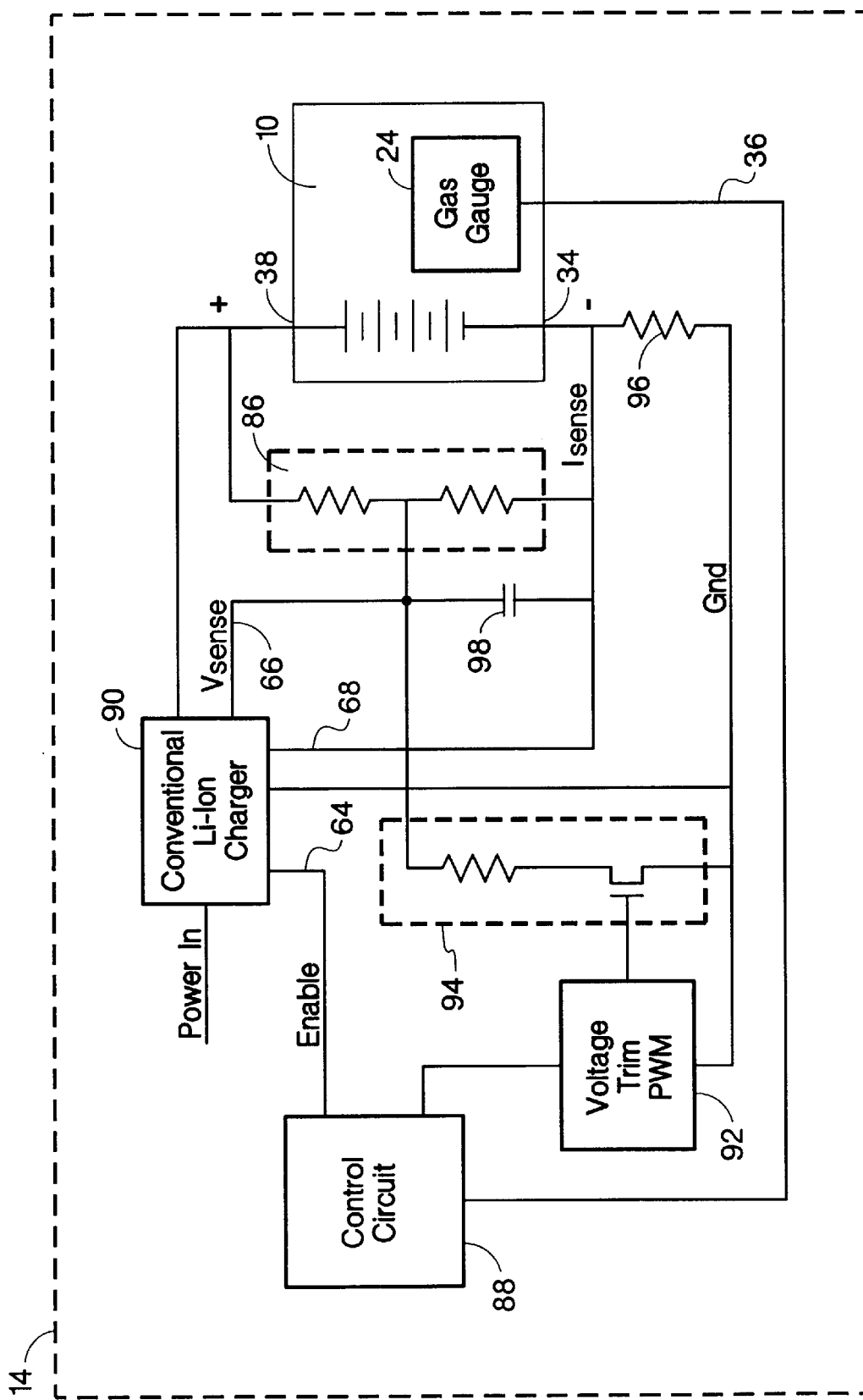
FIG. 5 is an exemplary block diagram of an alternative embodiment of a battery charger for implementing the invention.

FIG. 5 is an exemplary block diagram of an alternative embodiment of a stand-alone charger 14 that can be used with a conventional charger 90, such as for a Li-Ion battery pack, to implement the invention's method of charging the battery 10. Conventional charger 90 is a typical constant current/constant voltage pulse width modulated Li-Ion battery charger. It converts the power in it receives to an applied voltage on the battery with a charge current. Conventional charger 90 typically has a voltage sense input 66, a current sense input 68, and an enable input 64. The voltage sense input 66 usually requires a voltage that is some fixed ratio of the battery 10 voltage between positive terminal 38 and negative terminal 34. For this embodiment, this fixed ratio is set by a resistor divider network 86 and optionally filtered with filter cap 98. The output of the resistor divider network 86 is connected to the voltage sense input 66. In this embodiment, a current sense resistor 96 is placed in series between the battery's negative terminal 34 and the conventional charger's ground. The voltage across the current sense resistor 96 is provided to the current sense input 68 of the conventional charger 90. A control circuit 88 turns on and off the conventional charger 90 by controlling the enable input 64. Preferably, but optionally, the control circuit is connected to the voltage sense input 66 and the current sense input 68 to monitor the applied voltage and charge circuit to the battery. In addition, the control circuit is optionally connected to the communication channel 36 of battery 10 to read parameters from a gas gauge IC 24. The control circuit 88 is connected to a trim circuit 94, shown in this embodiment as a resistor and FET transistor in series. The trim circuit 94 is connected between the voltage sense input 66 and ground. The control circuit 88 preferably uses a pulse width modulated (PWM) output or other digital to analog output to drive the trim circuit 94. When charging is required, the control circuit 88 enables the conventional charger 90 to supply a charge current to the battery 10. At the same time, the control circuit 88 activates the trim circuit 94 using a 100% duty cycle from the PWM output to voltage trim 92 to accordingly reduce the applied voltage sensed by the conventional charger 90. This voltage trim adjustment is set to allow the conventional charger 90 to charge the battery to a delta peak voltage essentially equal to the aggregate recommended charge voltage plus the product of the internal resistance of the battery and the charge current. Once this peak voltage is reached, the conventional charger 90 changes to constant voltage mode to try to maintain this voltage. However, the control circuit subsequently monitors either time, battery current, or a gas gauge parameter such as capacity, charge current, or cell voltage to adjust the PWM duty cycle to controllably reduce the amount of voltage trim at voltage sense input 66. By lowering the duty cycle of the voltage trim 92 connected to the trim circuit 94, the voltage sense input will increase in value thus causing the conventional charger 90 to reduce its applied voltage and charge current output. Preferably, the charge current output is controlled such that it declines in essentially a linear manner and/or such that the recommended charge voltage on the battery cells in battery 10 are not exceeded. When the battery 10 is fully charged, the duty cycle applied to the voltage trim 92 is 0%, thus allowing the conventional charger 90 to maintain the aggregate recommended voltage on the battery 10. Voltage trim 92 is preferably implemented as a digital output from control circuit 88 using PWM. Optionally, the PWM output can be an digital to analog output and still meet the spirit and scope of the invention. Therefore, a conventional charger 90 can be easily converted to the invention's method of charging by only using a resistor and a transistor and a small amount of firmware.

Figure 6:
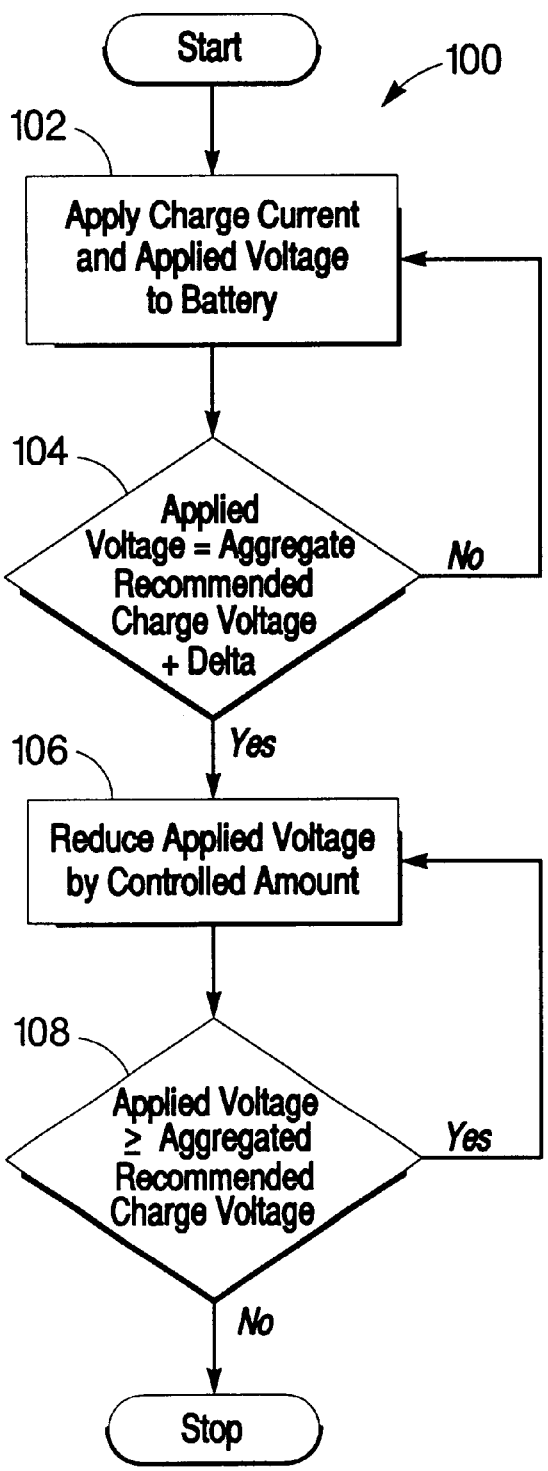
FIG. 6 is an exemplary flow chart describing the method of implementing the invention.

FIG. 6 is an exemplary flow diagram of the general method 100 of the invention to charge batteries. First in block 102, an applied voltage and charge current are applied to a battery. Then in block 104, the applied voltage is checked to see if the aggregate recommended charge voltage of the battery plus a delta amount is reached. Preferably, the delta amount is the product of the internal resistance of the battery and the applied charge current but optionally, any lesser predetermined amount can be used to effectuate some benefit of reduced charge time or reduced peak power while preventing the overvoltage circuitry in the battery from being activated. If the applied voltage has not met this level then the battery charger continues to apply the charge current and applied voltage. When the applied voltage is equal to the aggregate recommended charge voltage plus the delta amount, the battery charger reduces the applied voltage to the battery in a controlled manner in block 106. The applied voltage of the battery is checked in block 108 to see if the aggregated recommended charge voltage is reached. If not, then the battery charger continues to reduce the applied voltage to the battery in a controlled manner. When the applied voltage to the battery is essentially equal to the aggregated recommended charge voltage the battery charging stops unless a maintenance charging is desired to counter self-discharge of the battery.

Figure 7:
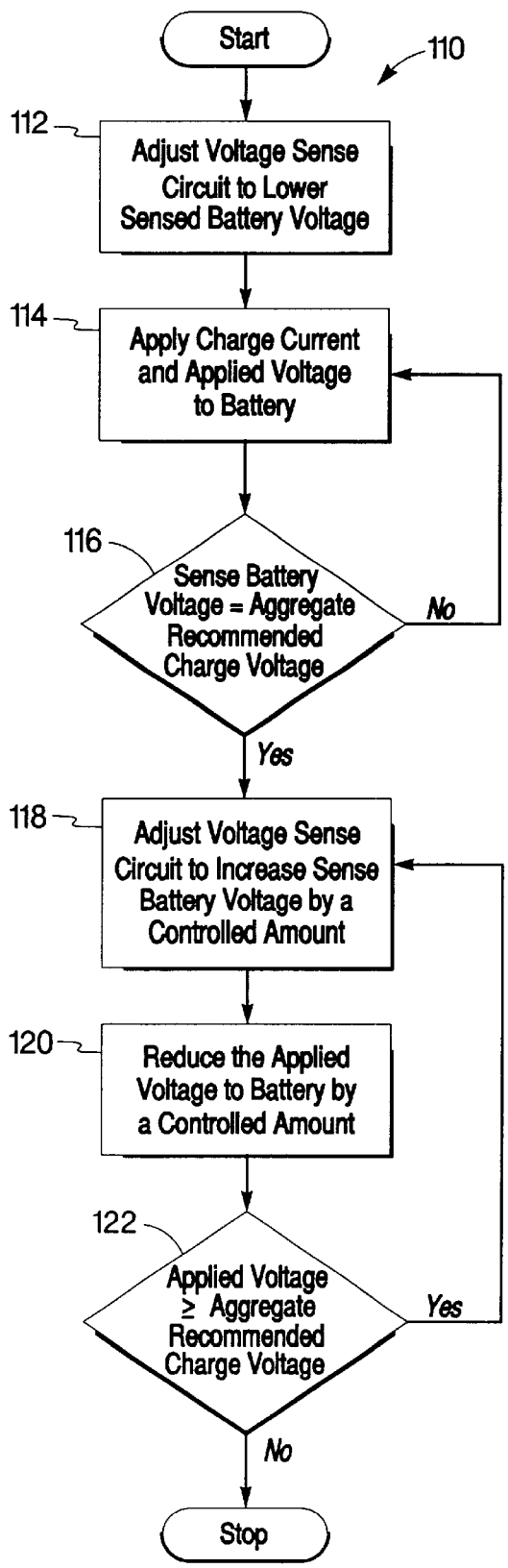
FIG. 7 is an exemplary flow chart describing an alternative method of implementing the invention.

FIG. 7 is an exemplary flow diagram of an alternative method 110 to implement the invention using a conventional battery charger. First in block 112, the voltage sense circuit is adjusted to lower the sensed battery voltage to the charger. Then in block 114, the charger applies a charge current and an applied voltage to the battery. In block 116, the charger determines if the sensed battery voltage is essentially equal to the aggregate recommended charge voltage of the battery. If not, then the charger continues to apply the charge current and applied voltage. If so, then in block 118, the voltage sense circuit is adjusted to increase the sensed battery voltage to the charger in a controlled manner. This is turn, in block 120, causes the charger to reduce the applied voltage to the battery in a controlled manner. Then in block 122, the charger determines if the applied voltage is greater than the aggregate recommended charge voltage. If so, then the voltage sense circuit is further adjusted to increase the sense voltage in a controlled manner and thus continue to reduce the applied voltage to the battery in a controlled manner. When the applied voltage is essentially equal to the aggregate recommended charge voltage, then charging stops unless a maintenance charge is desired.

FIGS. 8 and 9 are tables showing exemplary empirical parameters that can be used to establish the controlled rate of decline in applied battery voltage for reducing battery charge time and reducing peak power, respectively. Several different methods can be used to effectuate the controlled rate of applied voltage decline to the battery. The controlled rate can be continuous or performed in discrete steps depending on how the control circuit is implemented. Generally, when using a digital control circuit, such as a microcontroller, microprocessor, or digital signal processor, the controlled rate of applied voltage decline will occur in discrete steps which will be in effect substantially linear although appear stair-stepped.

For example, using the values in the table of FIG. 8 to reduce battery charge time, the control circuit can monitor the charge current and control the amount of applied voltage to the battery. Here assuming the aggregate recommended charge voltage is 12.6V and the delta amount is 200 mVolts and the initial charge current is 2.5 Amps, the controller would undertake the following steps. The controller would reduce the applied voltage to 12.77 volts and wait for the charge current to reach 2.2 Amps. Then the controller would reduce the applied voltage to 12.74 and wait for the current to drop to 1.9 A. Then the controller would reduce the applied voltage to 12.71 and wait for the current to drop to 1.6 A. This controller keeps reducing the battery voltage until the current drops by a difference of 0.3 A until the applied voltage is equal to the aggregate recommended charge voltage and the charge current is reduced to the fully charged specified level set by the battery manufacture. The applied voltage settings are preferably determined by empirical testing as the actual values are dependent on cell chemistry, internal wiring, and battery temperature. Thus, the applied voltage settings may also need to be adjusted for battery or ambient temperature during charging.

Alternatively, rather than monitoring the charge current, the elapsed time can be monitored and the applied voltage reduced as the time elapsed intervals occur. For example based on empirical testing, every 5 minutes of elapsed time from the voltage peak being reached, the applied voltage can be appropriately reduced and the resulting current to the battery will be substantially linear. Another alternative is to read the charge capacity of the battery from a battery gauge IC. As the capacity reaches predetermined empirically tested levels, the applied voltage is reduced and ultimately the charge current is reduced. The empirically tested levels are chosen such that the rate of decline of charge current is substantially linear and the recommended charge voltage on cells with the battery are not exceeded.

Yet, another approach is to have a controllable current source in the power source of the charger. The control circuit applies a current from the controllable current source until the voltage sense circuit detects a voltage greater than the aggregate recommended charge voltage. Subsequently, the control circuit applies a substantially linear declining current from the controllable current source until the voltage sense circuitry detects the battery having substantially the aggregate recommended charge voltage.

The table in FIG. 9 is a list of exemplary parameter values for controlling the rate of decline of the applied voltage of the battery to reduce the peak power to the battery while still maintaining a substantially linear decline in charge current.

Although several different exemplary embodiments have been shown and described, those skilled in the art will recognize the several modifications can be made to the described embodiments and still meet the spirit and scope of the invention.

What is claimed is:

1. A charger for a battery having a recommended charge voltage, comprising:
   a power source controlling an applied voltage and a charge current to the battery, the power source including a voltage sensing circuit; and
   a control circuit connected to said power source wherein said control circuit provides a current to the battery from said power source until a battery voltage higher than the recommended charge voltage is detected by said voltage sensing circuit, and wherein said control circuit thereafter reduces the applied voltage towards the recommended charge voltage at a controlled rate.

2. An electronic device comprising the charger of claim 1.

3. The charger of claim 1 wherein the controlled rate of reducing the applied voltage results in the charge current being reduced at a substantially linear rate.

4. The charger of claim 1 wherein the controlled rate of reducing the applied voltage is determined by time intervals.

5. The charger of claim 1 wherein the controlled rate of reducing the applied voltage is determined by detecting discrete current levels.

6. The charger of claim 1 wherein the controlled rate of reducing the applied voltage is performed by changing the detected applied voltage of the battery.

7. The charger of claim 1, wherein said battery further includes an additional voltage sense circuit for detecting the voltage across the at least one cell and wherein the additional voltage sense circuit is connected to the control circuit and wherein the rate of reducing the applied voltage is determined by said control circuit detecting cell voltage from the additional voltage sense circuit.

8. The charger of claim 1, where said battery further has a capacity gauge and wherein said control circuit is capable of reading said capacity gauge and wherein the controlled rate of reducing applied voltage is determined by detecting capacity gauge levels.

9. The charger of claim 1 wherein said power source further comprises a pulse width modulation circuit (PWM) capable of controlling the applied voltage and charge current to the battery, said PWM connected to said control circuit.

10. The charger of claim 1 wherein said power source comprises a programmable current source having a maximum applied voltage output.

11. The charger of claim 1 wherein said power source comprises a programmable voltage source having a maximum charge current output.

12. The charger of claim 1 wherein said power source comprises a voltage source and a current source selectable by said control circuit.

13. A charging apparatus for a battery having a recommended charge voltage, comprising:
 a current source having an adjustable voltage source output; and
 a control circuit connected to said current source wherein said control circuit applies said current source at a first charge current rate to the battery until a first applied voltage to the battery is reached that is greater than the recommended charge voltage and wherein the control circuit subsequently trims the adjustable voltage source output at a controlled rate such that the charge current is substantially linearly reduced to a second charge current rate wherein the adjustable voltage source output is substantially equal to the recommended applied voltage of the battery.

14. A charging apparatus for a battery having a recommended charge voltage, comprising:
 a controllable current source connected to said battery;
 a voltage sense circuit connected to said battery;
 a current sense circuit connected to said battery; and
 a control circuit connected to said controllable current source, said voltage sense circuit, and said current sense circuit wherein said control circuit applies a current from said controllable current source to the battery until a voltage greater than the recommended charge voltage is detected by said voltage sense circuit, and subsequently said control circuit applies a substantially linear declining current from said controllable current source to the battery until the voltage sense circuit detects said battery having substantially the recommended charge voltage.

15. A battery charge circuit for a battery having a recommended charge voltage, comprising:
 a power source having an output providing a charge current and an applied voltage to the battery, and a first input for varying the charge current and a second input for varying the applied voltage; and
 a control circuit having a current sense and a voltage sense both connected to said battery, said control circuit connected to said first input and said second input of said power source wherein said control circuit applies a charge current to the battery until a first voltage on the battery is reached, and reducing the applied voltage towards the recommended charge voltage at a controlled rate such that the rate of decline of current supplied to the battery is substantially linear.

16. A charging apparatus for a battery having a recommended charge voltage, comprising:
 a power source controlling an applied voltage and a charge current to the battery;
 a current sensing circuit connected to the battery;
 a voltage sensing circuit connected to the battery;
 a voltage trim circuit connected to the voltage sensing circuit; and
 a control circuit connected to said power source, said voltage trim circuit, said voltage sensing circuit, and said current sensing circuit wherein said control circuit supplies the charge current to the battery with said first power source until the applied voltage on the battery is greater than the recommended charge voltage by a predetermined amount, and wherein said control circuit thereafter reduces the applied voltage on the battery towards the recommended charge voltage at a controlled rate using said voltage trim circuit to adjust the voltage sensing circuit such that the rate of charge current decline is substantially linear.

17. A charger for a battery having an internal resistance and at least one cell having a recommended charge voltage, the battery further having an aggregate recommended charge voltage, comprising:
 a power source capable of providing an applied voltage and a charge current to the battery; and
 a control circuit connected to said power source wherein said control circuit is capable of detecting the applied voltage of the battery and capable of enabling the charge current and the applied voltage from said power source to the battery until the applied voltage detected is greater than the aggregate recommended charge voltage by an amount less than the product of the internal resistance and the charge current, and wherein said control circuit thereafter is capable of reducing the applied voltage towards the aggregated recommended charge voltage at a controlled rate such that the recommended charge voltage of the at least one cell is not exceeded.

18. A method of charging a battery having an aggregate recommended charge voltage and at least one cell having a recommended charge voltage, comprising the steps of:
 applying a charge current and an applied voltage to the battery; and
 subsequently detecting that the applied voltage is substantially equal to the aggregate recommend charge voltage plus a predetermined amount; and
 subsequently reducing the applied voltage to the battery towards the aggregated recommended charge voltage at a controlled rate such that the recommended charge voltage of the at least one cell is not exceeded.

19. A charger for a battery using the method of claim 18.

20. An electronic device having a battery using the method of claim 18 to charge the battery.

21. A method of charging a battery having an aggregate recommended charge voltage and at least one cell having a recommended charge voltage, comprising the steps of:
 adjusting a voltage sense circuit to lower a sensed battery voltage by a predetermined amount;
 applying a charge current and an applied voltage to the battery until the sensed battery voltage is substantially equal to the aggregate recommend charge voltage; and
 adjusting the voltage sense circuit to increase the sensed battery voltage at a controlled rate thereby subsequently reducing the applied voltage to the battery towards the aggregate recommended charge voltage at a controlled rate such that the recommended charge voltage of the at least one cell is not exceeded.

22. A charger for a battery using the method of claim 21.

23. An electronic device having a battery using the method of claim 21 to charge the battery.

* * * * *